United States Patent Office 3,468,994
Patented Sept. 23, 1969

---

3,468,994
DIMETHYLSULFOXIDE IN SOLVENT SYSTEM FOR POLYOLEFIN COATING COMPOSITION
Dixie E. Gilbert, Bartlesville, Okla., assignor to Phillips Petroleum Company, a corporation of Delaware
No Drawing. Filed June 27, 1966, Ser. No. 560,881
Int. Cl. B29c *17/00;* B29d *23/10*
U.S. Cl. 264—94                   8 Claims

ABSTRACT OF THE DISCLOSURE

A polyolefin substrate such as a parison or a preformed container is coated with a vinyl halide polymer or copolymer or mixture thereof which vinyl polymer is dissolved in a solvent mixture having a dimethylsulfoxide content of from 1 to 50 percent by volume based on the total solvent mixture.

---

This invention relates to an improved method for coating plastic containers. In another aspect, this invention relates to an improved method of laminating polyolefin bottles with vinyl halide polymers and copolymers thereof. In another aspect, this invention relates to an improved solvent for the abovementioned halogenated resins, the use of which will result in a more uniform, tightly adhering coating of said resins to polyolefin containers.

Polyolefin containers such as polyethylene and polypropylene have been widely used for packaging foods, cosmetics, pharmaceuticals and various other products with great success. However, these bottles do possess one serious disadvantage of allowing some compounds such as essential oil to permeate through the walls. This results not only in losses of the packaged product, but the disfigurement of the appearance of the container as well.

Attempts have been made to prevent this permeation by coating or laminating another plastic to the polyolefin base, but until recently these attempts have proven costly and not wholly satisfactory.

One object of this invention is to provide an improved method for laminating polyolefin containers. Another object of the present invention is to provide an improved method for coating a substrate or preformed parison with a vinyl halide laminating material. A further object of this invention is to provide an improved solvent for vinyl halide laminating resins, the use of which will result in a more uniform, tightly adherent coating of said resins to a polyolefin container.

According to the invention, a tightly adherent, uniform coating of vinyl halide resins to a polyolefin container is made possible by adding a quantity of dimethylsulfoxide to the other resin solvent or solvents. Examples of such polyolefin containers are containers made from homopolymers and copolymers of ethylene, propylene, butylene, butadiene and mixtures thereof. Examples of these vinyly halide resins that may be used in laminating polyolefin bottles include homopolymers of vinyl chloride and vinylidene chloride; copolymers of vinyl halide with vinylidene chloride, vinyl chloroacetate, chlorostyrene, chlorobutadiene; copolymers of vinylidene halides such as vinylidene chloride with carboxylic acid vinyl esters such as vinyl acetate, vinyl propionate, vinyl butyrate, vinyl benzoate, esters of unsaturated acids such as alkyl acrylates, aromatic vinyl compounds, dienes, unsaturated amides, unsaturated nitriles and unsaturated carboxylic acid esters. Examples of solvents for the above-mentioned resins include toluene, methyl ethyl ketone, ethyl acetone, acetone, ethylene dichloride, trichloroethylene, dimethylformamide, tetrahydrofuran, and cyclohexanone. When dimethylsulfoxide is added with the other solvent or solvents and the resin dissolved therein, a clear solution results that may be applied evenly over the surface of a substrate or the inner surface of a preformed parison or container instead of the slurry or gel or slurry-solution that normally results when solvent is added to the resin. Thus, previous attempts in dissolving these coating resins in solvents have often times resulted in a thick gel or dispersion, which is sometimes quite lumpy and very difficult to apply evenly over the interior surface of the preformed parison or container, and the addition of the dimethylsulfoxide results in a clear solution that may be easily and evenly applied over the interior surface of a preformed parison or container which results therefore in a very even clear coating in the resulting container. If dimethylsulfoxide is not part of the coating formulation, not only is the coating discontinuous, but many times it is discolored and loosely adherent to the polyolefin container in localized areas. Therefore, the dimethylsulfoxide holds the solvent in the coating, making it flow easier and distribute more evenly and adhere tightly to the exposed base surfaces during the forming of the container. The containers may be formed by blow molding, thermoforming or any other analogous method.

In selecting the relative proportions of dimethylsulfoxide and other solvent or solvents and resin, it has been found that any amount of dimethylsulfoxide added to the resin and solvent mixture will notably increase the dissolution of the resin and will reduce the viscosity of the resulting solution, and the amount added is normally from 1–40 percent by volume of the resulting solution. Although, it must be noted, that if dimethylsulfoxide is used without another solvent, a viscous slurry solution is formed and no notable improvement in coatability is observed. The volume percent of dimethylsulfoxide can range from about 1 percent up to about 50 percent of the solvent-resin solution; however, the preferred amount is from 5–20 percent by volume of the resulting solution. With prior solvent systems, it has been found that the maximum amount of resin that can be dissolved in about 35 percent by volume, and warming is required to effect solution. The use of dimethylsufoxide in the solvent system allows solution to be effected at ambient temperature and the resin content to be increased to about 60 percent by volume. This results in more resin being deposited in a film from such a solution. Normally, however, the thickness of the film is determined by the method of application. It is also possible to use a tri-solvent system. These tri-solvent systems have been found to be very effective and their use results in a clear non-viscous solution that will coat a parison or substrate very evenly and result in a thin, tightly adherent lamination. Examples of some tri-solvent systems by volume percent are:

(a)

| | Percent |
|---|---|
| Dimethylsulfoxide | 5 |
| Methyl ethyl ketone | 55 |
| Ethyl acetone | 40 |

(b)

| | |
|---|---|
| Dimethylsulfoxide | 20 |
| Methyl ethyl ketone | 40 |
| Acetone | 40 |

(c)

| | |
|---|---|
| Dimethylsulfoxide | 10 |
| Methyl ethyl ketone | 60 |
| Toluene | 30 |

(d)

| | |
|---|---|
| Dimethylsulfoxide | 15 |
| Methyl ethyl ketone | 55 |
| Ethylene dichloride | 30 |

(e)

| | |
|---|---|
| Dimethylsulfoxide | 20 |
| Methyl ethyl ketone | 48 |
| Trichloroethylene | 32 |

It must be noted that in order to provide an effective barrier to permeability, it is only necessary that a very thin film of the resin be present, and as shown above, this invention provides a method of obtaining such a thin film. Therefore, a cost saving results because by using this method, less resin is used per container. Also, by utilizing this resin coating material with a plasticizer, parisons may be precoated and stored for months and then various shaped laminated containers may be formed without the necessity of special coating operations that must be adapted to each particular container configuration. Examples of such plasticizers are dioctyl phthalate, triethyl citrate, tricyclohexyl citrate, methyl phthalyl ethyl glycolate and the like. Containers coated by this method may be formed by conventional thermoforming methods such as vacuum forming and blow molding.

Open end parisons are coated by contacting the interiors of the preforms with a solution by a suitable method such as brushing or spraying. Flat thermoforming stock is also coated by brushing or spraying. Closed end parisons are coated by simply filling the parison with the solution and then withdrawing the liquid or by other suitable methods. These techniques result in a layer about 1 mil thick which is reduced to 0.1 to 0.2 mil in the forming operation. This thickness appears to be optimum for many uses, based on data for clarity, adhesion and permeability resistance. However, other thicknesses can be used. It has been demonstrated that the permeation rate of orange oil is reduced to one-half and the permeation rate of oxygen is reduced to one-third through a polyvinyl chloride lined polypropylene bottle compared to an unlined polypropylene bottle. Also, the permeation rate of oxygen is reduced to one-fourth through a polyvinylidene chloride lined polypropylene bottle compared to an unlined polypropylene bottle.

It has thus been found that dimethylsulfoxide acts as a very effective wetting and solvating agent for resins. Its use aids in the faster dissolution of the resin, reduces the viscosity of the resulting solution, prevents gel formation, and imparts solution stability. These factors all combine to give a more uniform and continuous coating of the resin on the walls of the parison.

The following examples are given to better illustrate the invention but are in no way intended to limit the invention.

EXAMPLE I

A 20 cc. portion of unplasticized polyvinyl chloride and a 100 cc. portion of methyl ethyl ketone were placed into a container and mixed. The methyl ethyl ketone would not wet the polyvinyl chloride at room temperature; therefore, the mixture was heated to 200° F. until a clouded slurry was formed. The slurry-solution was then applied to the interior of a preformed polypropylene parison by brushing and then was allowed to cool at room temperature. The parison was then placed into a bottle blowing apparatus and heated to 330° F. and then an 8 ounce bottle was blown. Visual inspection of the bottle indicated that the polyvinyl chloride was poorly coated on the interior of the polypropylene bottle. The coating was uneven and blistered and could be easily separated from the polypropylene by pulling on the raised film around the blisters.

EXAMPLE II

Next, 20 cc. of unplasticized polyvinyl chloride was mixed with 100 cc. of methyl ethyl ketone and 20 cc. of dimethylsulfoxide at room temperature. A clear solution was formed. The resulting solution was then brushed onto the interior of a preformed polypropylene parison. The parison was then placed into a bottle blowing device, heated to 330° F. and an 8 ounce bottle was then blown. The resulting bottle appeared clear and there were no uneven or blistered places due to poor adhesion of the polyvinyl chloride to the interior of the propylene bottle wall. Permeability of the resulting bottle was then checked by filling it with orange oil and measuring the weight loss over a 24 hour period. A similar unlaminated polypropylene bottle blown with the same bottle forming device was also filled with orange oil. After 24 hours it was found that the laminated bottle lost 1 gram of orange oil and the unlaminated bottle lost 2 grams of orange oil; therefore, the permeation rate of orange oil through the laminated bottle was reduced to one-half of that through the unlaminated bottle. Oxygen permeation tests were also run on these bottles. The polyvinyl chloride lined bottles reduced oxygen permeation to one-third that of the unlined bottles, and the polyvinylidene chloride lined bottles reduced oxygen permeation to one-fourth that of the unlined bottles in a 24 hour period.

EXAMPLE III

Next, a mixture of resins was coated on a parison. A 25 cc. portion of unplasticized polyvinyl chloride and a 25 cc. portion of polyvinylidene chloride were added to 350 cc. of toluene and 55 cc. of dimethylsulfoxide. A clear solution was formed at room temperature. The solution was then brushed onto the interior portion of the preformed polypropylene parison. The coated parison was then heated to 330° F. and a bottle was blown. The bottle appeared clear with no uneven or blistered places.

I claim:

1. A method of coating a polyolefin parison, substrate, or preformed container comprising mixing a polyvinyl halide or vinyly halide copolymer of mixture of vinyl halide polymers with a resin solvent mixture having a dimethylsulfoxide content from 1 to 50 percent by volume based on the total solvent system including said dimethylsulfoxide, said solvent system being a solvent for said vinyl halide polymer, to thereby form a clear solution, and applying the resulting solution to the surface of the said polyolefin parison, substrate, or preformed container.

2. A method of forming containers comprising:
   (a) mixing a polyvinyl halide or vinyl halide copolymer or mixtures of vinyl halide polymers with a solvent mixture having a dimethylsulfoxide content from 1 to 50 percent by volume, based on the total solvent mixture including said dimethylsulfoxide, said solvent system being a solvent for said vinyl halide polymer,
   (b) applying the resulting solution to the surface of a parison or substrate, and
   (c) forming a container from the resulting coated parison or substrate.

3. The method of claim 2 wherein said polyolefin container is polypropylene.

4. The method of claim 2 wherein said polyolefin container is polyethylene.

5. The method of claim 2 wherein said resin solvent mixture is 1 to 50 volume percent dimethylsulfoxide and the rest toluene and said polyvinyl halide is polyvinyl chloride or polyvinylidene chloride.

6. The method of claim 2 wherein said resin solvent mixture is 1 to 50 volume percent dimethylsulfoxide and the rest methyl ethyl ketone and said polyvinyl halide is polyvinyl chloride or polyvinylidene chloride.

7. The method of claim 2 wherein said resin solvent mixture is 1 to 50 volume percent dimethylsulfoxide and the rest toluene and said mixture of vinyl halide polymers is a mixture of polyvinyl chloride and polyvinylidene chloride.

8. The method of claim 2 wherein said resin solvent mixture is 1 to 50 volume percent dimethylsulfoxide and the rest methyl ethyl ketone and said mixture of vinyl halide polymers is a mixture of polyvinyl chloride and polyvinylidene chloride.

References Cited

UNITED STATES PATENTS

| | | | |
|---|---|---|---|
| 2,811,497 | 10/1957 | Ham | 260—30.8 |
| 2,860,801 | 11/1958 | Nielsen | 117—138.8 X |
| 3,057,752 | 10/1962 | Covington et al. | 117—138.8 X |

OTHER REFERENCES

Chalmers, Dimethyl Sulphoxide, Paint Manufacture, February 1966.

WILLIAM D. MARTIN, Primary Examiner

J. E. MILLER, Assistant Examiner

U.S. Cl. X.R.

106—311; 117—138.8, 161, 95; 252—364; 264—134